(12) United States Patent
Nonnenmacher

(10) Patent No.: US 6,244,471 B1
(45) Date of Patent: Jun. 12, 2001

(54) METERING CONTAINER

(75) Inventor: Eberhardt Nonnenmacher, Ingersheim (DE)

(73) Assignee: Durr Dental GmbH & Co. KG (DE)

( * ) Notice: Subject to any disclaimer, the term of this patent is extended or adjusted under 35 U.S.C. 154(b) by 0 days.

(21) Appl. No.: 09/048,912

(22) Filed: Mar. 26, 1998

(30) Foreign Application Priority Data

Apr. 3, 1997 (DE) .......................................... 297 05 992 U

(51) Int. Cl.[7] ...................................................... B67D 5/38
(52) U.S. Cl. ........................ 222/158; 222/382; 222/377; 222/464.3; 222/464.7
(58) Field of Search ..................................... 222/158, 377, 222/382, 464.1, 464.7, 464.3; 73/426, 427, 429

(56) References Cited

U.S. PATENT DOCUMENTS

| 3,039,656 | * | 6/1962 | Wentz | 222/464.1 X |
| 5,110,013 | * | 5/1992 | Clark et al. | 222/464.7 X |
| 5,123,460 | * | 6/1992 | Reed | 222/158 X |
| 5,275,313 | * | 1/1994 | Petrillo et al. | 222/464.7 X |
| 5,573,046 | * | 11/1996 | Venooker et al. | 222/464.1 X |

* cited by examiner

Primary Examiner—Kenneth Bomberg

(57) ABSTRACT

A bottle for delivering predetermined volumes of liquid has two different standing surfaces (12, 14) and an immersion tube (48) whose inlet opening lies near one of said two standing surfaces. By standing the container on a first and then a second of said two standing surfaces, two predetermined volumes of liquid can be delivered without visual checking.

7 Claims, 9 Drawing Sheets

METERING CONTAINER

BACKGROUND TO THE INVENTION

Figure 1:
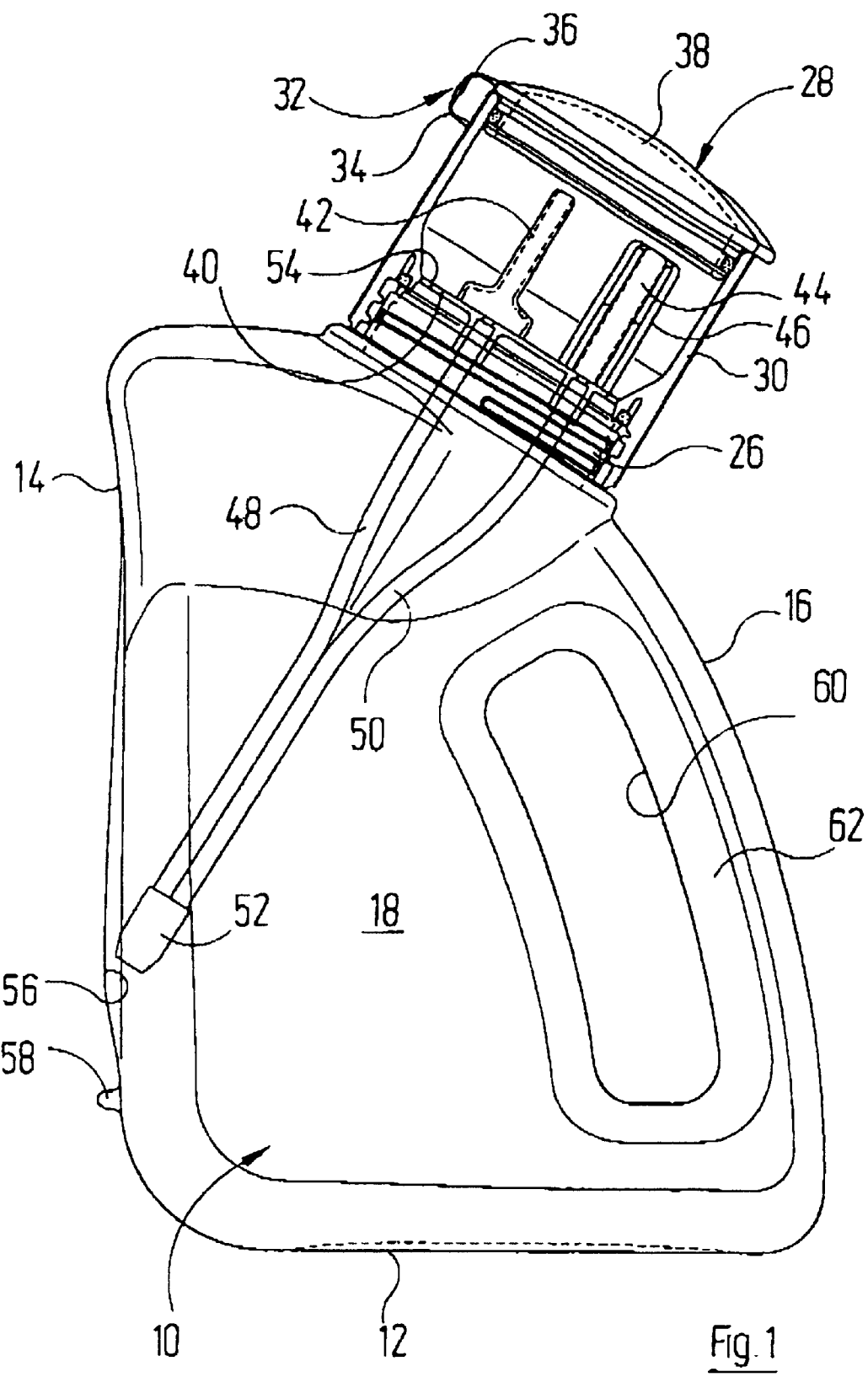

The invention relates to a container for pouring out predetermined volumes of liquid with an immersion tube run into the container interior.

Containers with immersion tubes for bringing out the liquid contained in them are known per se in the form of spray containers for window cleaning agents and similar. In them the immersion tube extends down to the bottom wall, in order that the container may be completely emptied. A dispenser screwed onto a container nozzle, and to which the immersion tube leads, has a pump operable by the user, which for each operating stroke sucks out of the container interior and delivers a volume of liquid predetermined by the latter's displacement. Said volumes of liquid lie in the range of fractions of one ml to several milliliters.

For many applications it is necessary, however, to bring out of a container greater predetermined volumes of liquid, which typically lie in the range between fractions of a liter and several liters. If the containers referred to above with a small manually operated metering pump were to be used, however, a very large number of operations of the pumps would be required for this. To avoid this, a time-controlled electrical metering pump could in principle be used. Such pumps are however expensive.

SUMMARY OF THE INVENTION

The present invention seeks to provide a container by which predetermined volumes in the range of a fraction of a liter up to several liters can be brought out of the container quickly and accurately.

Accordingly, the invention provides a container for delivering at least two predetermined volumes of liquid, the container including an immersion tube which extends into the container interior, and further including means for orienting the container in at least two predetermined positions are provided, in which in a first of said positions the part volume of the container left below the inlet opening of the immersion tube is greater than in a second of the positions.

In another aspect, the invention provides a container for delivering at least two predetermined volumes of liquid, the container including an immersion tube which extends into the container interior, the immersion tube having an inlet opening which can be set in at least two predetermined positions, in which in a first of said positions the part volume of the container left below the inlet opening is greater than in a second of the positions.

With the container according to the invention it is possible to set different relative positions between the end of the immersion tube and the level of the liquid contained in the container. There can be brought out of the container, in accordance with said various relative positions, different predetermined amounts of liquids, which are predetermined due to the fact that the end of the immersion tube projects out of the liquid level, which takes place with the different relative positions between immersion tube end and liquid level and with different residual amounts of liquid in the container.

The realization of such different relative positions between immersion tube end and level of the liquid contained in the container can be brought about with simple design measures regarding the container or regarding the immersion tube or its mounting. The costs thereby incurred are only small, particularly if the container is mass-produced as a plastics moulding.

With the mass production methods commonly employed today, the shape of a container can be realized in a simple manner both for metal containers and for plastics containers by corresponding shaping of the production mould. Preferably, the means for setting different positions of the container comprise different standing surfaces of the container. This enables a container to be provided cost effectively with several walls suitable as standing surfaces, which are used selectively as container standing surfaces, as a rule in a predetermined sequence.

Preferably, at least two of the different standing surfaces form substantially a right angle with one another. This can provide a choice different standing surfaces, which is of advantage in terms of compact form and clear differentiation of the various standing surfaces.

Preferably, the means for setting different positions of the container comprise different suspension points. This can be preferred for applications in which a horizontal standing area is not provided for the container. A supporting structure cooperating with the suspension point of the container (if necessary the finger of a user) can however be found everywhere. Because the center of gravity of the wholly or still only partially filled container is positioned below the particular suspension point selected, the associated respective relative position between immersion tube end and liquid level is set.

Preferably, the means for setting different positions of the inlet opening of the immersion tube comprise means for bending at least one section of the immersion tube. For example, this can be achieved by means of a rod bent into the immersion tube can be provided simultaneously with a scale readable e.g. at the delivery end of the immersion tube, on which scale is given the volume of liquid that can be removed from the container in the respective rod position.

Preferably, the means for setting different positions of the inlet opening of the immersion tube comprise means for swivelling the immersion tube. In this case the means for swivelling the immersion tube, which takes the form e.g. of a lever, can serve simultaneously as a pointer which passes in front of a scale attached to the container. Said scale indicates the volume of liquid removable from the container when the lever is in a particular position.

Preferably, the means for setting different positions of the inlet opening of the immersion tube comprise means for freeing respectively one of a plurality of different axially spaced inlet openings in the immersion tube, and that the immersion tube is sealed at the free end. In this construction of container, the immersion tube remains stationary. The selection of the respective inlet opening to be freed in the immersion tube can be realized particularly simply in this way. Here the operational end of the control tube can be provided simultaneously with a scale which indicates together with a mark made on the housing what volume of liquid can be removed from the container when the control tube has adopted a particular angular position.

Preferably, the immersion tube is surrounded liquid-tight by a rotatable control tube which comprises control openings axially aligned with the inlet openings, and that the control openings and the inlet openings are so distributed in the angular direction that in predetermined relative angle positions between control tube and immersion tube in each case exactly one inlet opening is also aligned with a control opening in the peripheral direction. This construction makes it possible to bring out the entire contents of the container via the immersion tube. It can also be advantageous for other applications to situate the end of the immersion tube at a distance from all the wall surfaces of the container, in which case there then remains in the container a pre-determined volume of residual liquid which can be poured out via a spout of the container.

Preferably, the wall of the container in a region adjacent to the end of the immersion tube is formed with a depression in which the end of the immersion tube can be received. This construction is of advantage in terms of a further improvement in the bringing out of residual liquid via the immersion tube.

Preferably, the container includes at least one further immersion tube which also has a delivery end and a connector fitting, in which the said immersion tubes are combined at their immersion ends and are connected at their delivery ends by means of the connector fitting. This can make it possible to connect different consumers to the container via different connecting lines, in particular those of a different diameter.

Preferably, the container includes a stopper part in which the immersion tube is supported, the stopper part being located releasably in a nozzle of the container. The actual container is of simple geometry and can be produced cheaply by the known methods of manufacture, in particular blow moulding. The stopper head, which exhibits more intricate geometry and has in some cases also to be provided with fittings for the connection of consumers, is a separate container part and can be manufactured e.g. by injection moulding from a more rigid plastics material.

Preferably, the stopper part includes a peripheral wall. With this construction, the fittings for connecting the consumer are covered on the outside and hence protected against unintentional loosening of the connection. When the cap is closed, they are also protected against soiling during protracted non-use of the container.

Preferably, the stopper part is a plastics injection moulded part and the cap is mounted on the peripheral wall by means of an integral hinge, preferably comprising two spaced hinge sections. This has the advantage of cheap manufacture of a bung head sealable by a cap.

Preferably, the stopper part has at least one vent opening. this allows a constant pressure equalization takes place during the emptying. The container itself does not therefore need to be made of very rigid material, and despite this it is guaranteed that exactly the desired volumes of liquid are delivered.

Preferably, the container comprises when viewed laterally a first standing wall, a second standing wall which is longer than the first standing wall and extends substantially perpendicular thereto, and a roughly quarter-elliptical wall connecting the ends of the first and second standing walls, which walls form together a peripheral wall of the container, the peripheral wall of the container being sealed by side walls which are convexly bowed relative to the container, wherein the delivery end of the immersion tube lies in the vicinity of the acute apex of the quarter-elliptical wall. Such a container has clearly recognizable different standing surfaces; the other walls of the container are so formed that they can recognizably not serve as standing surfaces.

Preferably, a reach-through opening is formed adjacent to the obtuse apex of the part-elliptical wall. This can facilitate the carrying and positioning of a container.

INTRODUCTION TO THE DRAWINGS

Figure 2:
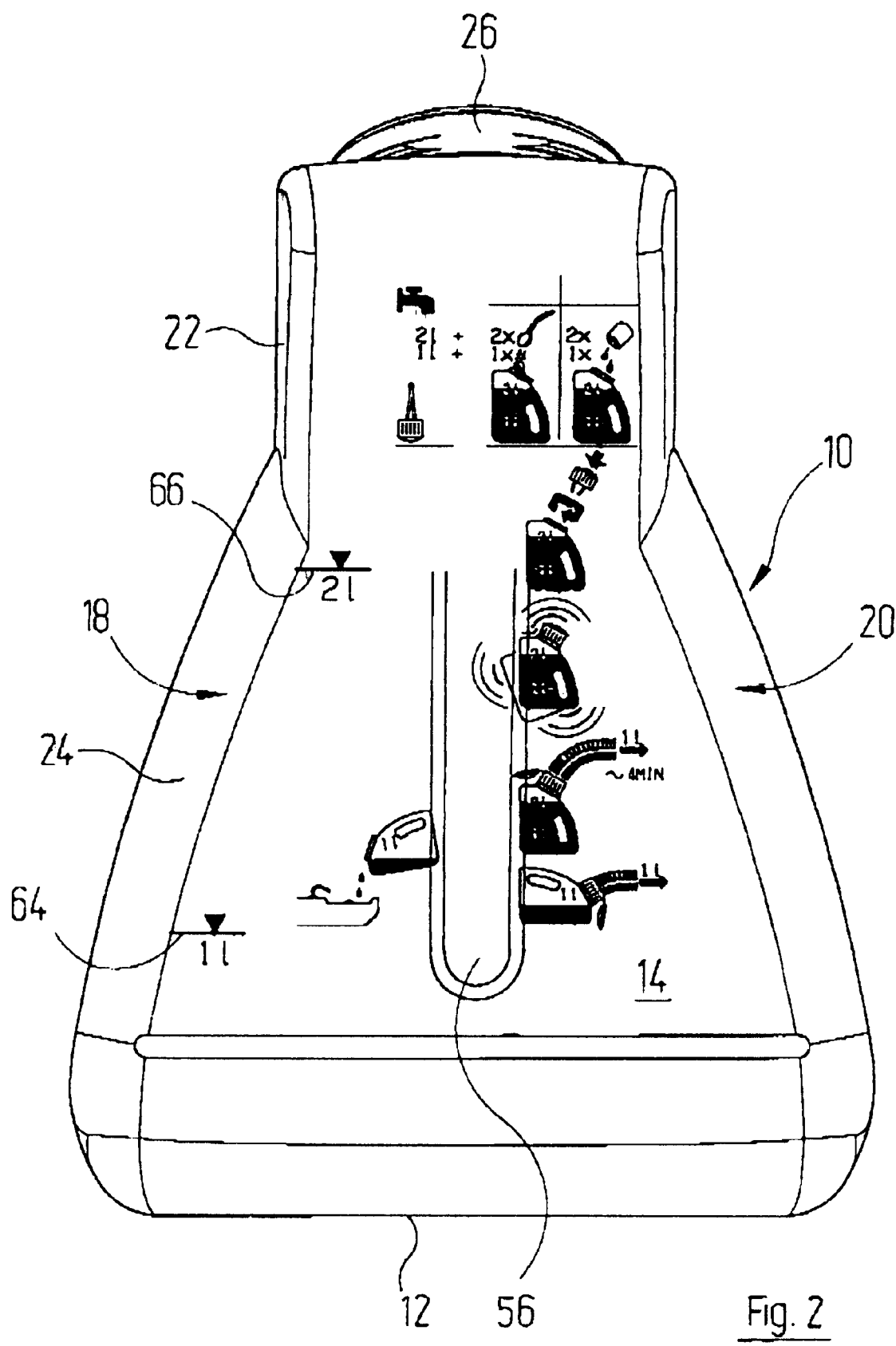
Figure 3:
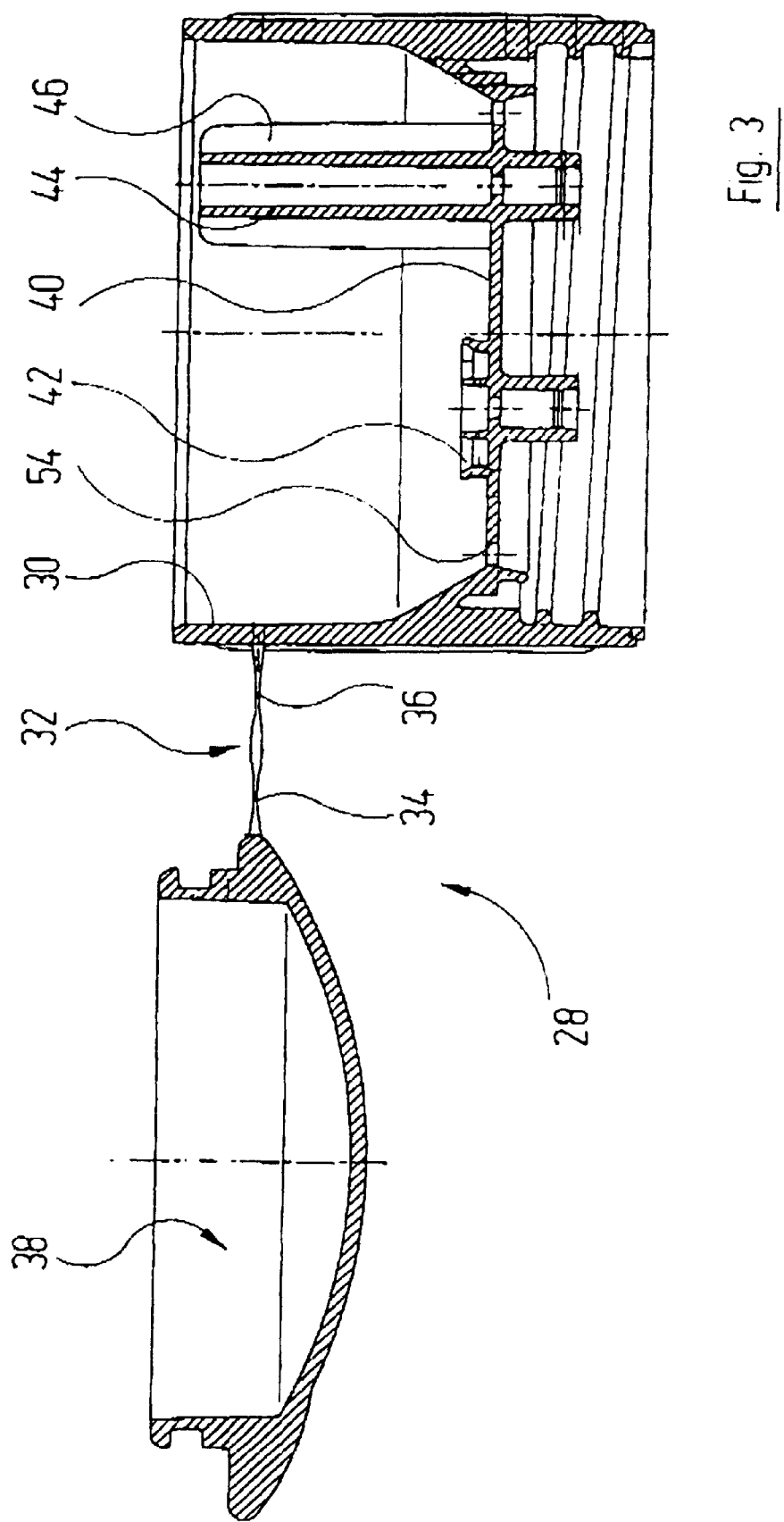
Figure 4:
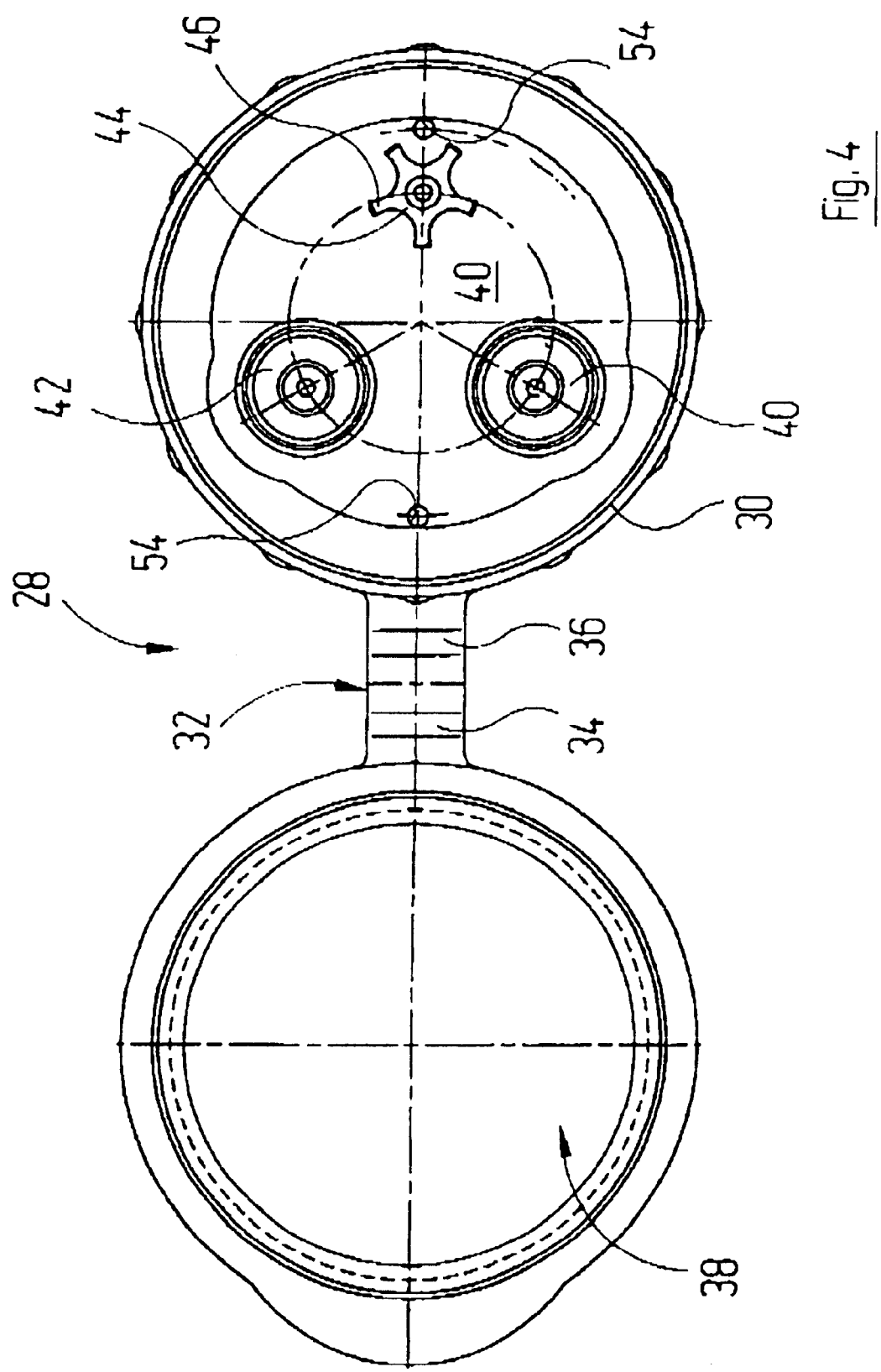

FIG. 1 shows a lateral view of a container for delivering two identical volumes of liquid, FIG. 2 an overhead from the left onto the container shown in FIG. 1, FIG. 3 an axial section through a screwed-on bung head of the container according to FIGS. 1 and 2 with cap articulated via an integral hinge, shown in the open state, FIG. 4 an overhead view onto the bung head shown in FIG. 3; and FIGS. 5 to 9 show similar views to FIG. 1, in which however modified containers are reproduced.

DESCRIPTION OF PREFERRED EMBODIMENTS

Embodiments of the invention will now be described with reference to the drawings in which various metering bottles are shown as if their walls consisted of transparent material.

FIGS. 1 and 2 show a blow-moulded bottle body 10 with a bottom wall 12 and an end wall 14 perpendicular thereto. The end wall 14 is roughly a third longer than the bottom wall 12. The two ends of said walls positioned substantially perpendicular to one another are connected to one another by a rear wall 16 roughly quarter-elliptical in the view of FIG. 1. The bottle part formed by the aforementioned walls is sealed by two side walls 18, 20 symmetrical to the median plane of the bottle body. The latter are plane in an upper wall section 22 and bowed after the manner of a pear in a lower wall section 24.

The rear wall 16 bears in its upper third a threaded nozzle 26. There is screwed onto the latter a bung and seal part designated overall as 26. The latter has a cylindrical peripheral wall 30, to which a cap 38 is articulated via an integral hinge 32 with two hinge sections 34, 36 (cf. FIG. 3).

A transversal supporting wall 40 of the bung and seal part 28 bears, as can be been in particular from FIGS. 3 and 4, three pipe connections 40, 42, 44 distributed uniformly in the peripheral direction. The pipe connections 40 and 42 are disposed symmetrically to the median plane of the bung and seal part 28 and are stepped bodies of rotation. The pipe connection 44 comprises a plurality of fins 46 running in radial direction and distributed regularly around the connection axis.

There are inserted into ends of the pipe connections 40, 42 and 44, which ends are run below the supporting wall 40, three immersion tubes, of which the immersion tubes 48, 50 are visible in FIG. 1. The bottom ends of the immersion tubes are open and summarized by an olive button 52.

Two vent openings 54 diametrically opposite one another are further provided in the supporting wall 40.

The form and length of the immersion tubes is so selected that the olive button 52 engages with a descending groove 56 which is let into the end wall 14. Below the groove 56 the end wall 14 supports a baseboard 58 which is slightly higher than the groove 56.

In the section of the bottle body 10 which lies to the right in FIG. 1 is provided an engagement opening 60, which forms together with the rear wall 16 a handle 62.

On the rear wall 14 are provided two marks 64, 66, which determine the liquid level on filling with a liter or two liters of liquid.

If the container described above is filled up to the 2 l mark and a suction hose is then connected to one of the pipe connections 40, 42, 44, the liquid contained in the bottle body 10 can be drained down to the bottom ends of the immersion tubes. Said end of the immersion tubes lies at the 1 l mark.

There can then be sucked out of the bottle precisely a further liter of liquid if the bottle is stood on the end wall 14 instead of on the bottom wall 12. The bottom ends of the immersion tubes then lie below in the volume of liquid left in the bottle body 10, and the remainder of the liquid can be sucked out of the bottle body by suction on one of the pipe connections 40, 42, 44.

Two precisely predetermined volumes of liquid are therefore delivered during the emptying of the metering bottle without visual checking.

It goes without saying that the embodiment described above can be modified in various ways in order to enable more than two volumes of liquid to be sucked out. It is required for this simply to provide the bottle body with a correspondingly greater number of standing surfaces. Thus one or both of the side walls 18, 20, for example, can be constructed to run in a plane, so that said walls also are considered as standing surfaces. The immersion tubes are then bent so that their ends exhibits different spacings from the two side walls 18, 20. In addition the curved rear wall 16 can be replaced by a plane-surface wall. Finally, there can also be provided at the transition between bottom wall and end wall 14 an additional greater plane-surface wall, which is e.g. inclined at less than 45° relative to the bottom wall 12.

It is important simply that a plurality of predetermined defined positions are created for the bottle body, in which the ends of the immersion tubes lie in such a way that different volumes of residual liquid remain below them.

Different predetermined volumes of liquid can also be removed with a container such as that described above if the user misses out e.g. a standing surface assigned to a mean residual volume and goes on directly to the next or last standing surface. In this case also the delivery of predetermined amounts of liquid is obtained without visual checking.

For uses in locations where defined standing surfaces for the bottle body are not available, suspension lugs can be provided on the bottle body 10, wherein the bottle body, when suspended on the latter, assumes under the effect of gravity, together with the liquid contained in it, a predetermined position.

Figure 5:
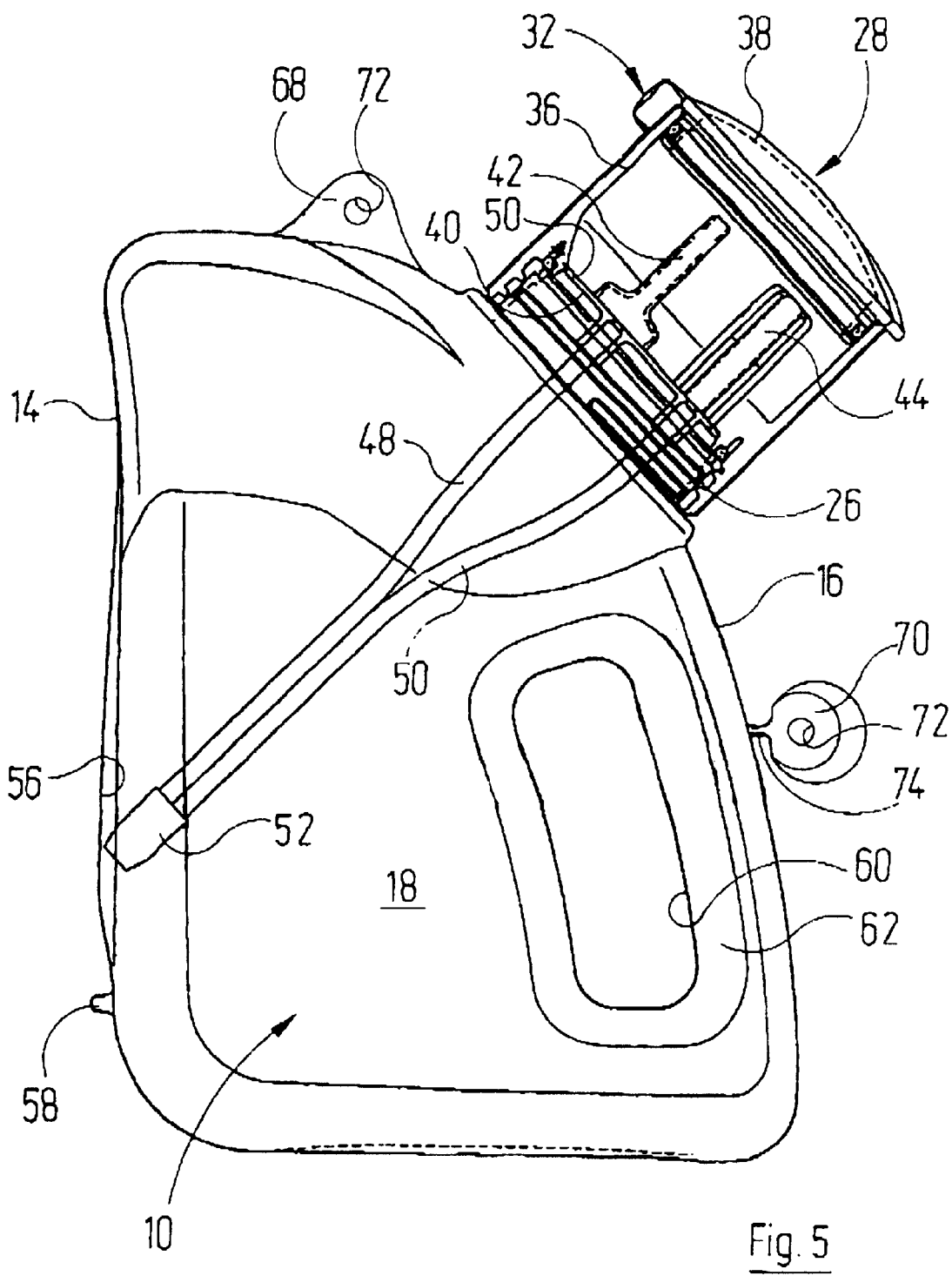

In the embodiment shown in FIG. 5, which otherwise corresponds to that according to FIGS. 1–4, there are provided for this purpose additionally in the upper area of the rear wall 16 and in the right bottom area of the rear wall 16 two suspension lugs 68, 70, which each comprise an opening 72 by which they can be suspended. The suspension lug 70 is in addition not torsion-proof, but is connected to the bottle body 10 via a flexible section 74, so that the suspension lug 70 can also be gripped with the fingers and the bottle body can despite surface contact with the fingers settle down in such a way that the center of gravity lies below the flexible section 74.

In the embodiment according to FIG. 5 the position of the suspension lugs 68, 70 is chosen so that the bottle together with its contents orients itself at the end of a removal operation exactly as if it were stood on a horizontal standing surface with the bottom wall 12 or the end wall 14.

The removal of defined amounts of liquid from the bottle as per FIG. 5 takes place as described above with reference to FIGS. 1 to 4.

Figure 6:
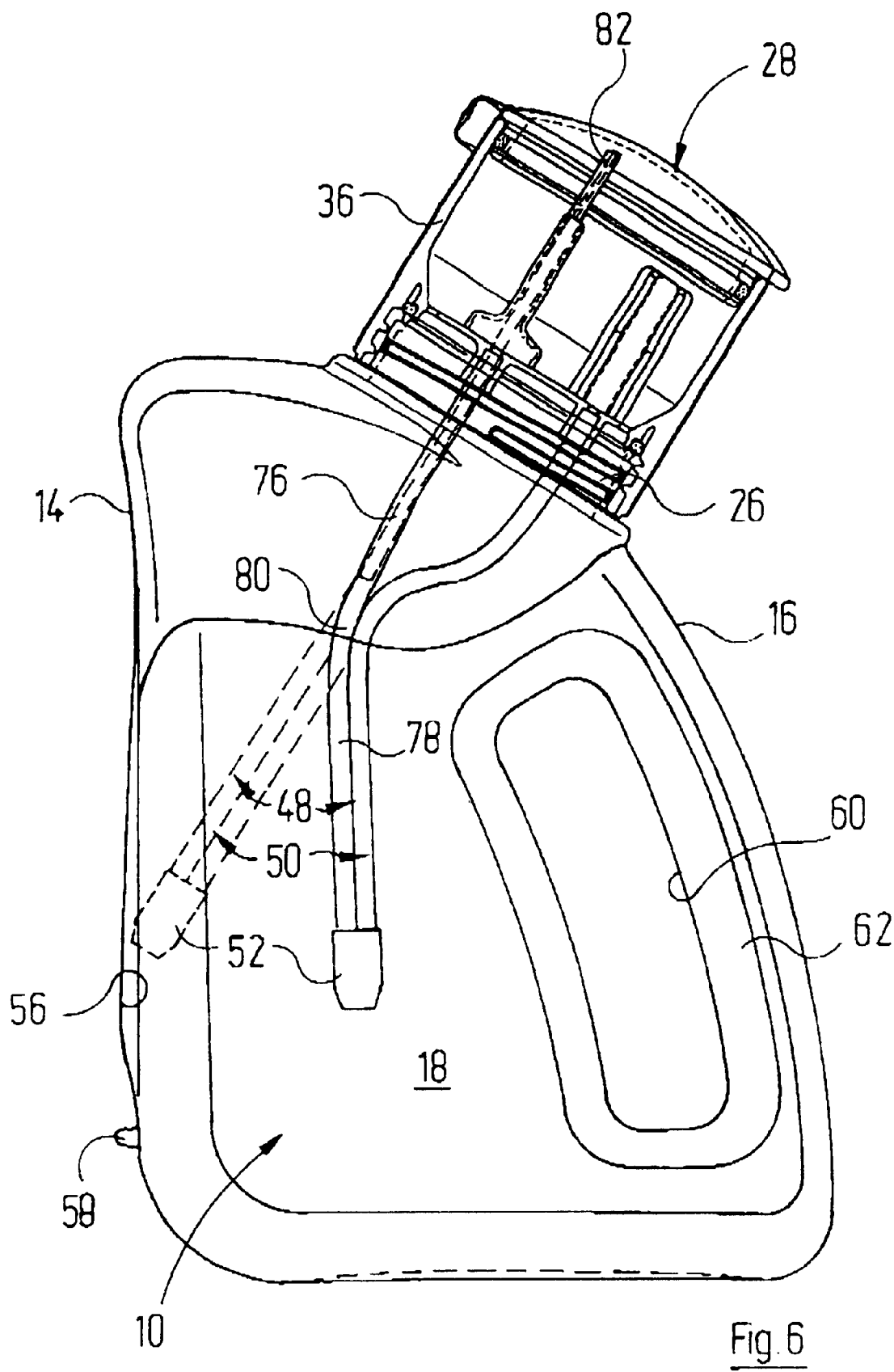

In the bottle according to FIG. 6 one of the immersion tubes 48 has two rigid sections 76, 78 which are connected by an elastic pipe section 80. The latter is curved in the unstressed state, and the other immersion tubes are made of flexible material so that the immersion tube arrangement normally assumes the position shown in FIG. 6. In the case of a container that has a total capacity of two l, said position is selected so that a liquid volume of 1 l still lies below the ends of the immersion tubes.

A rigid rod 82 is displaceable in the immersion tube 48, which has in transverse cross-sectional view the form of a cross between whose longitudinal fins axial passages for liquid remain.

If the rod 82 is pushed fully into the pipe connection 40 out of the position shown in FIG. 6, it straightens the immersion tube 48 and the immersion tube arrangement acquires the geometry shown in broken lines in FIG. 6. In said geometry the bottle body 10 can be drained completely again, as described above.

It goes without saying that intermediate positions of the ends of the immersion tubes can be set by only partial advancing of the rod 82, so that the amount of liquid that can be sucked out can be set continuously between the end positions, shown in FIG. 6, of the immersion tubes. To enable the particular volume of liquid then removable with lye to be predetermined, the rod 82 can be provided with a corresponding scale which is read off at the upper edge of the pipe connection 40.

In the case of the bottle shown in FIG. 6 there is in addition to the methods of setting the amount of liquid delivered which have just been described also the method already described in the preceding embodiments, which is obtained by choice of the standing surface. By a combination of the two methods it is possible to set an even greater number of precisely predetermined different amounts of liquid, which can be sucked out of the container without visual checking.

Figure 7:
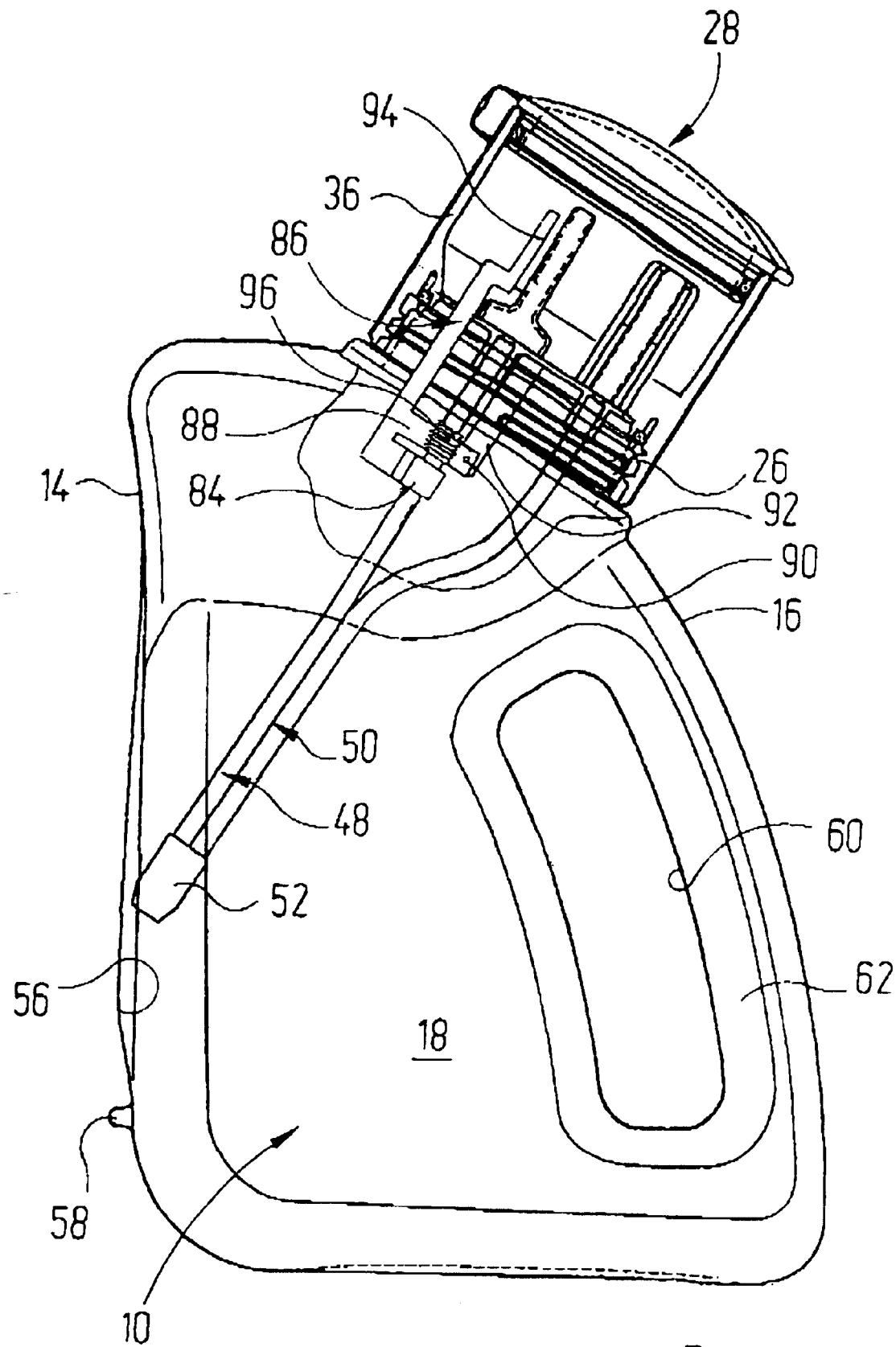

In the embodiment according to FIG. 7 the one of the immersion tubes 48 is rigid and connected to a two-arm lever 86 by a clip 84. Its bearing bracket 88 is supported on a shoulder 92 of the supporting wall 40 by a pin 90. An offset actuating arm 94 of the lever 86 extends towards the open side of the peripheral wall 30. The delivery side end of the immersion tube 48 is connected to the associated pipe connection 40 via a bellows 96. The other immersion tubes are again formed as flexible hoses.

By swivelling of the lever 86 the immersion tube arrangement can be placed in two end positions again, the one of which is reproduced in FIG. 7 by solid lines, the other by broken lines, in order to predetermine two different volumes of liquid to be delivered. It goes without saying that intermediate positions can again be set, as described in detail with reference to FIG. 6. Reference is also made to the embodiment under FIG. 6 as regards the additional modifiability of the predetermined volumes of liquid by variation of the standing surface.

Figure 8:
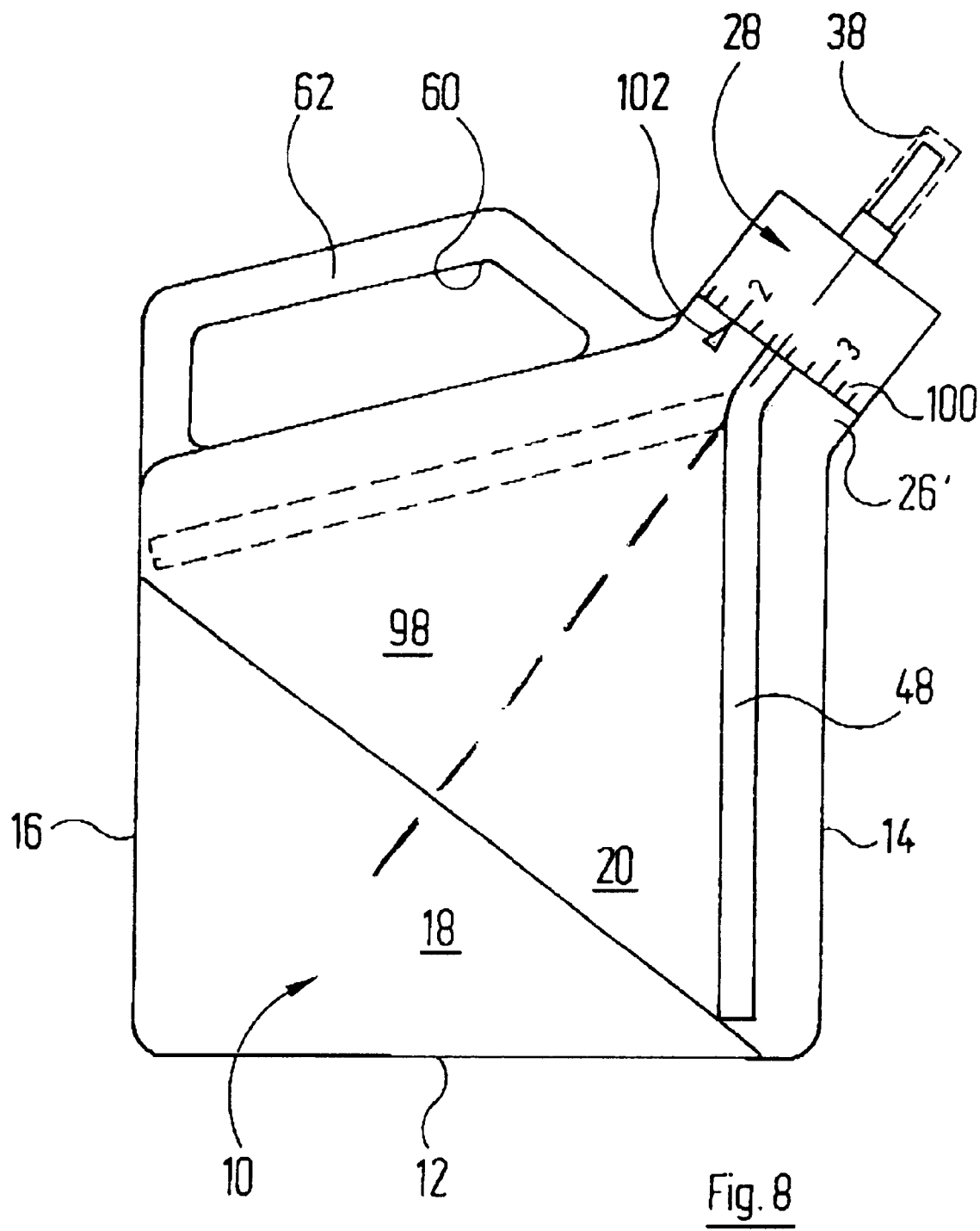

In the case also of the embodiment according to FIG. 8, bottle parts which have a similar function to the bottle parts already described above are again provided with the same reference symbols, even if the geometry is slightly different. Instead of the threaded nozzle 26 a nozzle 26' is provided, which comprises a peripheral annular tee slot to which a bung and seal part 28 is rotatably clipped. The latter bears a rigid immersion pipe 48 angled relative to the axis of the bung and seal part 28. The latter extends in an end position parallel with the rear wall 16 down to the bottom wall 12. By rotation of the bung and seal part 28 the immersion tube 48 can be moved into an uppermost position indicated by a broken line in FIG. 8. In order to permit said movement, the front side wall 18 is provided with a half-conical wall section 98, which lies slightly radially outside the area passed through on rotation of the immersion tube 48.

The container shown in FIG. 8 is always stood on the bottom wall 12 under conditions of use. The respective amount of liquid freed for the sucking out can be set by rotation of the bung and seal part. In order to facilitate this, the outer surface of the bung and seal part 28 can be provided with a scale 100 which is read off on a fixed reference mark 102 on the bottle body 10.

Figure 9:
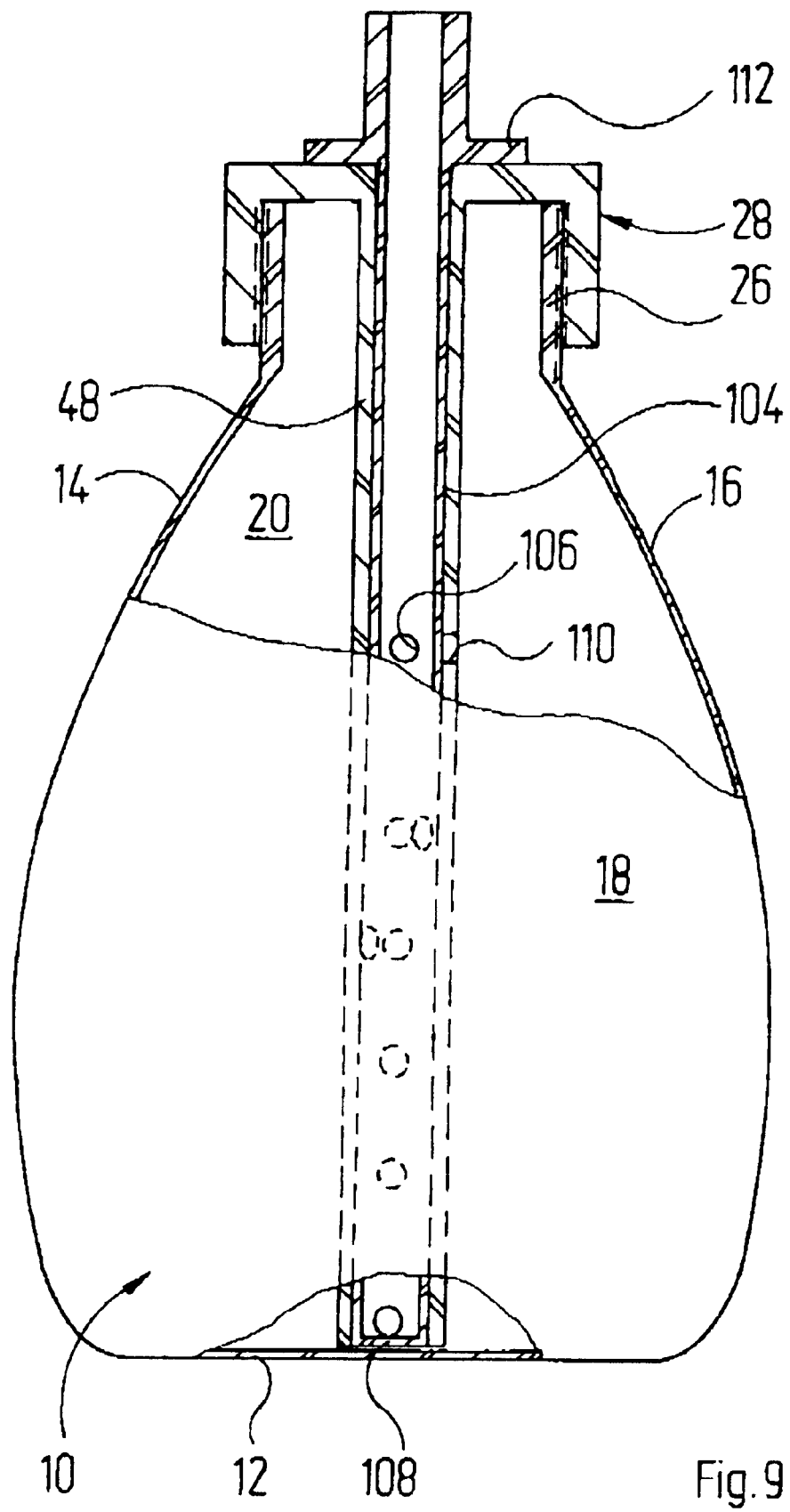

In the metering container according to FIG. 9 a seal part 28 screwed down onto the bottle body 10 bears rotatably a control pipe 104 extending down to the bottom wall 12, which control pipe 104 is provided with six axially spaced control openings 106 distributed uniformly in peripheral direction.

There is inserted rotatably into the control tube 104 an immersion tube 48, which is sealed at the bottom end by an end wall 108. The immersion tube 48 has a plurality of inlet openings 110 which are aligned with one other in peripheral direction and are each aligned with one of the control openings 106 in axial direction. It is therefore possible by rotation of the immersion tube 48 to align selectively one of the inlet openings 110 with one of the control openings 106, whereby defined volumes of liquid are once again freed for a sucking out of the container. In order to facilitate the setting, a scale disc 112 is integrally moulded with the immersion tube 48, the scale of which indicates the various liquid volumes commandable through the position of the control openings. The scale disc 112 is again used together with a fixed mark which is provided on the upper frontal area of the seal part 28.

What is claimed is:

1. A container for delivering at least two predetermined volumes of liquid, the container including an immersion tube which extends into the container interior from a delivery end to an immersion end, further including means for setting the container in at least two predetermined positions, in which in a first of said positions a part volume of the container left below an inlet opening of the immersion tube is greater than in a second of said positions, the immersion end of the immersion tube being spaced from corners of the container, said container further including at least one further immersion tube which also has a delivery end and a connector fitting, in which said immersion tubes are combined at their immersion ends and are connected at their delivery ends by means of the connector fitting.

2. A container as claimed in claim 1, which includes a stopper part in which the immersion tube is supported, the stopper part being located releasably in a nozzle of the container, in which the stopper part has a peripheral wall which projects axially beyond the connector fitting and is hermetically sealable by a cap.

3. A container as claimed in claim 2, wherein the stopper part is a plastic injection moulded part and the cap is mounted on the peripheral wall by means of an integral hinge.

4. A container as claimed in claim 3, wherein the integral hinge comprises two spaced hinge sections.

5. A container as claimed in claim 2, wherein the stopper part has at least one vent opening.

6. A container for delivering at least two predetermined volumes of liquid, the container including an immersion tube which extends into the container interior from a delivery end to an immersion end, and further including means for setting the container in at least two predetermined positions, in which in a first of said positions a part volume of the container left below an inlet opening of the immersion tube is greater than in a second of said positions, the immersion end of the immersion tube having a predetermined position and being spaced from corners of the container, wherein the container comprises when viewed laterally a first standing wall, a second standing wall which is longer than the first standing wall and extends substantially perpendicular thereto, and a roughly quarter-elliptical wall connecting ends of the first and second standing walls, which wall form together a peripheral wall of the container, the peripheral wall of the container being sealed by side walls which are convexly bowed relative to the container, wherein the delivery end of the immersion tube lies in the vicinity of an acute apex of the quarter-elliptical wall.

7. The container as claimed in claim 6, wherein a reach-through opening is formed adjacent to an obtuse apex of the quarter-elliptical wall.

* * * * *